United States Patent [19]

Fujihira

[11] Patent Number: 5,070,322
[45] Date of Patent: Dec. 3, 1991

[54] AN OVERHEATING DETECTION CIRCUIT INCLUDING A REVERSELY BIASED JUNCTION HAVING A TEMPERATURE DEPENDENT REVERSE LEAKAGE CURRENT FOR DETECTING OVERHEATING OF A POWER INTEGRATED CIRCUIT

[75] Inventor: Tatsuhiko Fujihira, Kanagawa, Japan
[73] Assignee: Fuji Electric Co., Ltd., Kanagawa, Japan
[21] Appl. No.: 553,340
[22] Filed: Jul. 17, 1990

[30] Foreign Application Priority Data

Jul. 19, 1989 [JP] Japan .................................. 1-186951
Mar. 5, 1990 [JP] Japan .................................. 2-53086

[51] Int. Cl.$^5$ .......................................... G08B 17/06
[52] U.S. Cl. .................................. 340/653; 307/310; 340/598; 357/28; 374/157; 374/178
[58] Field of Search ................. 340/653, 598; 374/152, 374/178; 307/310; 357/28

[56] References Cited

U.S. PATENT DOCUMENTS 4,730,228 3/1988 Einzinger et al. .................. 374/178
4,854,731 8/1989 Jenkins ................................ 374/178
4,924,212 5/1990 Fruhauf et al. ..................... 340/598

FOREIGN PATENT DOCUMENTS 0240807 10/1987 European Pat. Off. .

OTHER PUBLICATIONS

E. Habekotté, Silicon Temperature Sensors, Bull. ASE-/UCS 76 (1985) 5, 9 mars, pp. 272–276.
J. Proctor, Temperature Transducer IC Is Linear Over Wide Range, Electronic Design, Apr. 5, 1984, pp. 133–140.
O. H. Schade; "Thermal Shutdown Circuitry," RCA Technical notes; No. 1270, Mar, 2, 1981, pp. 1–3.
D. M. Embree; "Thermal Shutdown Circuit," Technical Digest—Western Electric; Nos. 72, Oct. 1983, pp. 15–16.

Primary Examiner—Glen R. Swann, III
Attorney, Agent, or Firm—Finnegan, Henderson, Farabow, Garrett, and Dunner

[57] ABSTRACT

An overheating detection circuit has a simple circuit construction and may be formed in the same substrate as that of a power integrated circuit. It can produce a large output signal in response to detection of a temperature within a preselected range of detection temperatures. The circuit includes a reversely biased junction having a temperature dependent reverse leakage current, means for amplifying the reverse leakage current, and means for producing a voltage in accordance with the amplified reverse leakage current and for producing a signal when the voltage exceeds a threshold voltage to indicate that the power integrated circuit is overheated.

10 Claims, 8 Drawing Sheets

PRIOR ART

AN OVERHEATING DETECTION CIRCUIT INCLUDING A REVERSELY BIASED JUNCTION HAVING A TEMPERATURE DEPENDENT REVERSE LEAKAGE CURRENT FOR DETECTING OVERHEATING OF A POWER INTEGRATED CIRCUIT

BACKGROUND OF THE INVENTION

1. Field of the Invention

The present invention relates to an overheating detection circuit for use with a power integrated circuit (IC) and, more specifically to an overheating detection circuit comprising a simple circuit construction which may be formed in the same substrate as that of a power IC, and which can produce a large output signal in response to a detection of a temperature within a range of detection temperatures.

2. Description of the Related Art

Because power devices are used under high voltage and large currents, an abrupt increase in a load connected to the device or a shortcircuiting of the load can result in large currents in excess of the rated current of the device flowing through the device, thereby creating a danger that the device will become excessively heated and, in an extreme case, that the device will be destroyed. To protect a power device against such thermal destruction, the temperature of the power device is constantly monitored and, when the temperature of the device exceeds a predetermined temperature or an overheating of the device is detected, some protection action is taken, for example, the power device is turned-off.

In monitoring a power IC, it is preferable to fabricate an overheating detection circuit including a temperature sensor into a substrate in which the power IC is formed in order to improve temperature sensitivity and to simplify the circuit arrangement. Typically, however, discrete elements have been used for forming a circuit which stops an operation of a power device upon detection of eddy currents or an overheating of the power device. In connection with this, a thermal sensor using a bipolar transistor as a thermo-sensitive sensor is described in E. Habekotte, Bull. ASE/UCS 76 (1985) 5, 9mars, pp. 272-276.

Figure 10:
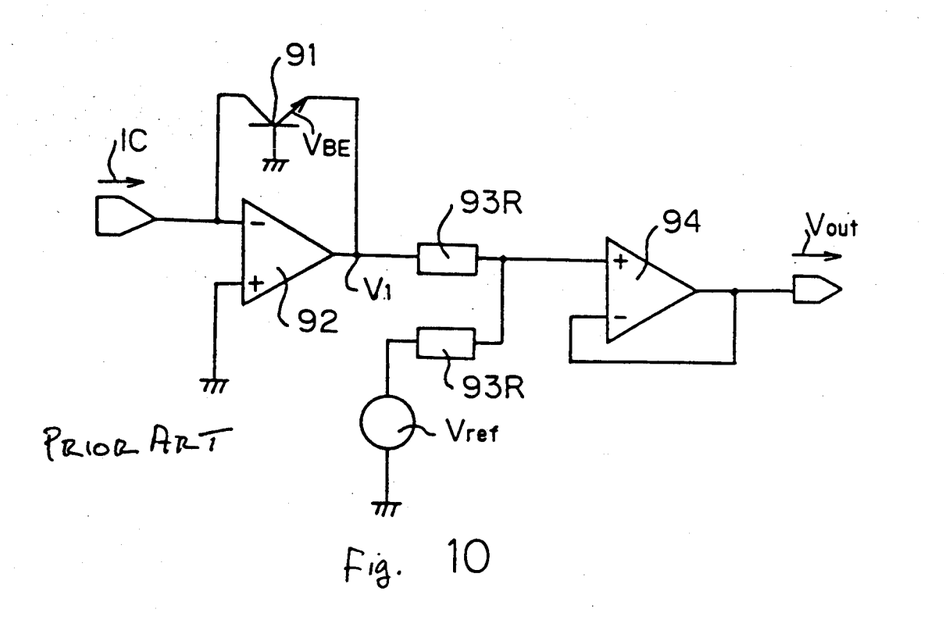
FIG. 10 is a circuit diagram showing a conventional overheating detection circuit.
Figure 11:
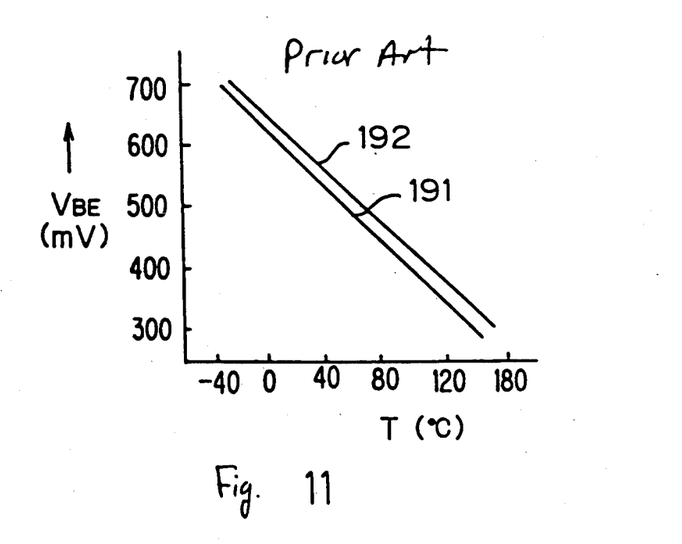
FIG. 11 is a graph showing $V_{BE}$ versus temperature characteristic curves useful for explaining the principle of the conventional overheating detection circuit of FIG. 10.

FIG. 10 illustrates a circuit arrangement of an overheating detection circuit of the prior art which uses the thermal sensor described in the above-cited reference. As shown in FIG. 10, a bipolar transistor 91, operating as a thermal sensor, is inserted into a feedback loop of an operational amplifier 92. An external constant current source (not shown) supplies a collector current $I_C$ to the transistor 91. The operational amplifier 92 produces an output voltage $V_1$, which is equal in amplitude but of reverse polarity to a base-emitter voltage $V_{BE}$ of the transistor 91 As shown in FIG. 11, the base-emitter voltage $V_{BE}$ varies linearly with and is inversely proportional to temperature T. By properly amplifying the output voltage $V_1$ of the operational amplifier 92 by another operational amplifier 94, an output voltage $V_{out}$ which varies linearly with respect to temperature T can be obtained.

A feature of the above thermal sensor is that the output voltage $V_{out}$ varies linearly with respect to changes in temperature, and that little error exists over a broad range of temperature change. However, when the thermal sensor is assembled, for example, into a power IC as an overheating detection circuit, one will encounter various problems. Because the circuit of FIG. 10 uses a constant voltage circuit with less temperature dependency and a comparator for comparison with the output voltage $V_{out}$, a large scale of circuitry is required for the thermal sensor. Further, it is necessary to minimize the temperature dependency of the operational amplifiers 92 and 94, as well as a reference voltage source $V_{ref}$. Otherwise, an error arising from the large temperature dependency of each of these components will greatly and adversely influence a detected temperature. To remove the adverse influence, most of the circuitry except the bipolar transistor 91 is fabricated and contained in a separate package which is placed at a location such that it is not influenced by the temperature of the power IC. Accordingly, when fabricating the circuit into a power IC package, it is necessary to solve the problems associated with the substrate temperature and the increased size of the circuit.

The conventional thermal sensor provides an output signal which varies linearly over a broad range of temperature changes. To the contrary, the conventional overheating detection circuit is designed such that when the temperature of a power device reaches approximately 150°-180° C., it determines that the device temperature has reached an overheating temperature, and produces an output signal. Therefore, the overheating detection circuit must produce an output signal which must vary greatly in accordance with a relatively small temperature range. Thus, the performance requirements of the conventional thermal sensor and overheating detection circuit are quite different from each other.

SUMMARY OF THE INVENTION

Accordingly, an object of the present invention is to provide an overheating detection circuit comprising a simple circuit construction which may be formed in the same substrate as that of a power IC, and which can produce a large output signal in response to a detection of a temperature within a range of detection temperatures.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described here, an overheating detection circuit is provided for use with a power IC for detecting an overheating of a power IC, the overheating detection circuit and the power IC both being formed in a substrate, comprising a reversely biased junction, a bipolar transistor for amplifying, to a predetermined level, a reverse leakage current which is derived from the junction and which varies with temperature, and a determining circuit for detecting the amplified reverse leakage current in the form of a potential drop across a constant current circuit and, when the detected voltage exceeds a predetermined value, for determining that the power IC is overheated and for producing a signal.

The above objects can also be achieved by providing an overheating detection circuit for use with a power IC for detecting an overheating of the power IC, the overheating detection circuit and the power IC both being formed in a substrate, comprising first and second detection circuits, each having a distinct detection temperature, and each including a reversely biased junction, a bipolar transistor for amplifying, to a predetermined level, a reverse leakage current which is derived from the junction and which varies with temperature, and a determining circuit for detecting the amplified reverse leakage current in the form of a potential drop across a constant current circuit and for producing a signal when the detected voltage exceeds a predetermined level to determining that the power IC is overheated, the detection temperature of the first detection circuit being in an overheating temperature region and the detection temperature of the second detection circuit being lower than that of the first detection circuit. The overheating detection circuit further comprises a hysteresis circuit operating such that, when the temperature of the power IC rises, the hysteresis circuit receives an output signal from the first detection circuit, thereby recognizing that the temperature exceeds the detection temperature of the first detection circuit, and produces a signal reporting an overheating of the power IC. Further, when the temperature of the power IC falls, the hysteresis circuit continues to output the overheating report signal until the hysteresis circuit detects an output signal from the second detection circuit, thereby recognizing that the temperature of the power IC has dropped below the detection temperature of the second detecting circuit.

Additionally, to achieve the same object, the overheating detection circuit may have a structure wherein, in a semiconductor surface region in which the reversely biased junction is formed, a third layer is formed between an interconnection wiring layer connected to a first layer of the junction and a second layer of the junction, the third layer being electrically connected to the second layer.

In an overheating detection circuit as mentioned above, by utilizing the temperature dependency of a reverse leakage current of a PN junction, for example, formed in a substrate in which a power IC is formed, temperature of the power IC is detected. The weak leakage current is amplified by a plurality of stages of bipolar transistors formed in the substrate.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

Figure 1:
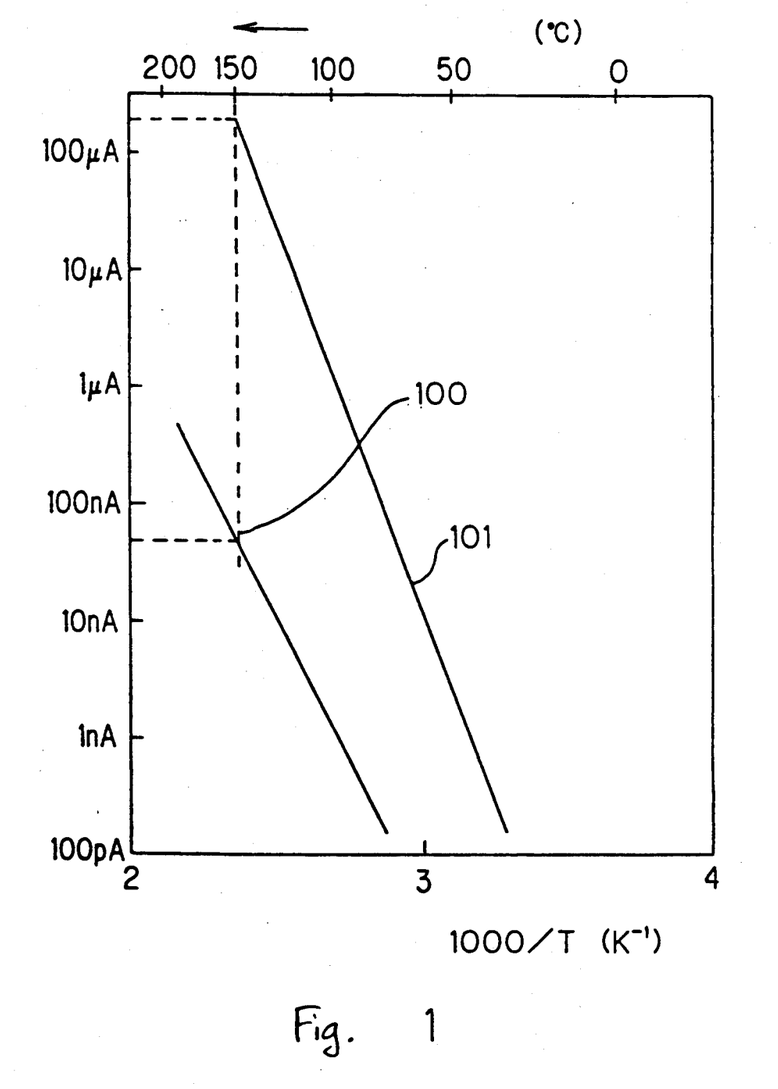
FIG. 1 is a graph showing reverse leakage current versus temperature characteristic curves useful in explaining the principle of the present invention.

FIG. 1 is a graph showing characteristic curves of the temperature dependency of the reverse leakage current of the PN junction, and the temperature dependency of an output current of the bipolar transistors. The principle and operation of the present invention will be described with reference to FIG. 1. In FIG. 1, curve 100 depicts a variation of the reverse leakage current of the PN junction with respect to a reciprocal of absolute temperature. As seen, the reverse leakage current $I_L$ varies linearly with and is inversely proportional to the reciprocal of the absolute temperature (i.e., variation of the reverse leakage current is positive against temperature), and it has a large temperature dependency. This fact implies that it is possible to detect an overheating of a power IC formed on a substrate in which the PN junction or a thermal sensor is also formed, by making use of this great temperature dependency. However, in the temperature range of 150°–180° C., which must be monitored, the reverse leakage current $I_L$ is weak, for example, 70 nA at 150° C. Therefore, it is difficult to read this leakage current exactly. In the present invention, remarking the fact that an amplification factor of the bipolar transistor also has a positive temperature dependency, an amplifier circuit including a plurality of stages of bipolar transistors is fabricated into the substrate of the power IC in order to amplify the weak leakage current. With this, an output current $I_E$, having a temperature dependency greater than that of the leakage current $I_L$, can be obtained as indicated by curve 101. An experiment showed that 100 μA or more of output current was measured at 150° C.

The amplified leakage current $I_E$ is converted into a voltage by making use of static characteristics of a depletion MOSFET (metal oxide semiconductor field effect transistor), for example, as a constant current circuit. In other words, the current $I_E$ in the detection temperature range is converted into a voltage signal having a greater temperature dependency. Check is made as to whether or not the converted voltage signal is within the overheating temperature range by using a buffer having a threshold value. When the voltage signal reaches the overheating temperature range, the buffer produces a 2-value signal. A protection measure against thermal destruction of the power IC can be taken in which a load connected to the power IC is turned-off in accordance with the 2-value signal.

A preset temperature range may be set between the transmission and stop of a signal reporting an overheating temperature by combining two overheating detection circuits each having a distinct detection temperature level, and a hysteresis circuit. An arrangement of such a combination prevents the repetitive outputting of the report signal when a load, for example, changes and, consequently, temperature fluctuates in the power IC. Otherwise, such a temperature fluctuation can be mistaken as an overheating of the power IC, and the load will be erroneously disconnected from the power IC. Accordingly, the combination arrangement provides reliable overheating detection while eliminating the mistaken recognition.

When the overheating detection circuit of the present invention is fabricated into a semiconductor integrated circuit having a high voltage power source, such as a power IC, the reverse biased power source voltage applied to the PN junction is also high. This high voltage extends the depletion layer of the PN junction such that the PN junction no longer functions as an ideal diode. More specifically, the excessively extended depletion layer greatly deviates a characteristic curve representative of a variation of the reverse leakage current at the PN junction from that of an ideal diode. In this case, a depletion layer should be formed near the PN junction to extend under an interconnection wiring layer. Such an extension of the depletion layer can be prevented by forming a conductive layer, such as a channel stopper, in the semiconductor substrate underlying the wiring layer such that it is coupled with the power source voltage thereby shutting off the depletion layer. With such a structure, unnecessary increases of the reverse leakage current and consequent mistaken detection of temperature can be eliminated thereby providing reliable overheating detection.

Figure 2:
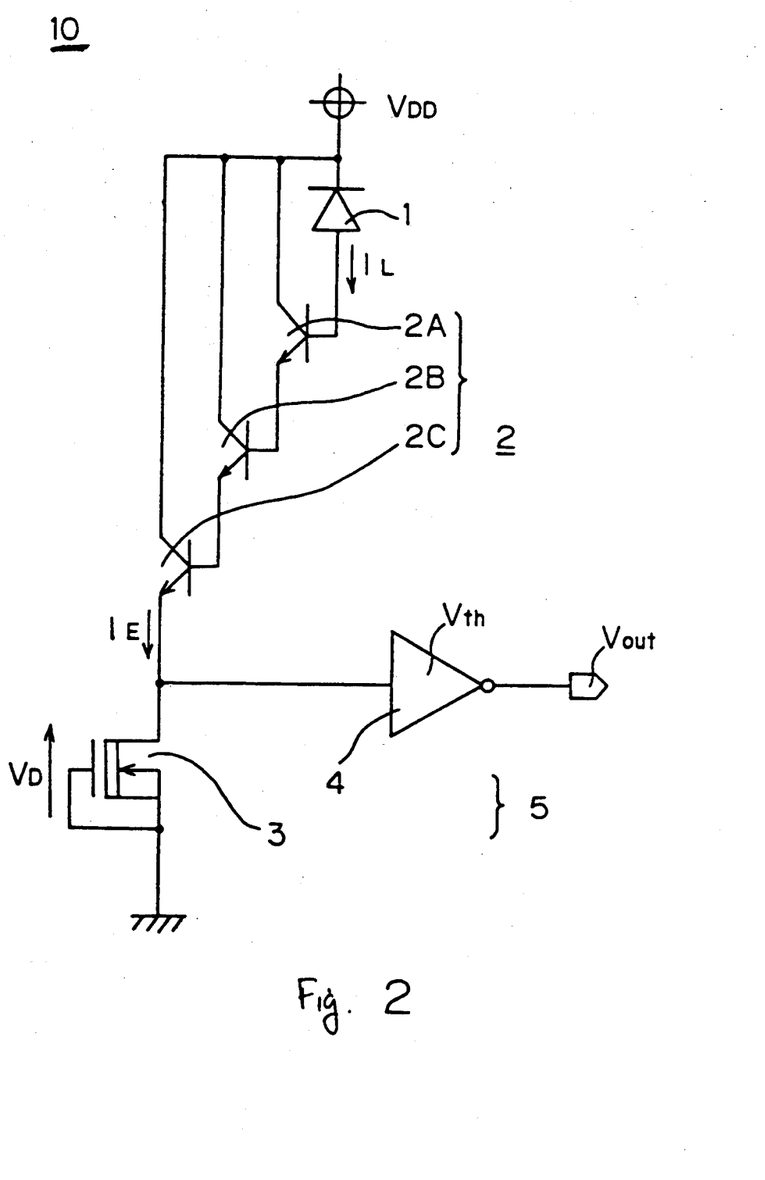
FIG. 2 is a circuit diagram of a first embodiment of an overheating detection circuit of the present invention.

As shown in FIG. 2, the overheating detection circuit according to a first embodiment of the present invention is formed in the same semiconductor substrate as that of the power IC. In the figure, reference numeral 1 designates a PN junction diode to which a reverse bias voltage $V_{DD}$ is applied. A reverse leakage current $I_L$ from the diode is amplified by a 3-stage amplifier 2, which is made up of three NPN bipolar transistors 2A, 2B, and 2C. The amplified reverse leakage current $I_E$ is derived from the emitter of the NPN transistor 2C. Reference numeral 3 designates a constant current circuit comprising a depletion type MOSFET having its drain connected to the emitter of the NPN transistor 2C. The MOSFET 3 converts the current $I_E$ in the vicinity of a detection temperature into a voltage signal $V_D$, i.e., a potential drop cross the MOSFET 3, by making use of a static characteristic of a constant current region of the MOSFET 3. The voltage signal $V_D$ is input to a buffer 4 comprising a large amplitude amplifier having a threshold voltage $V_{th}$. When the voltage signal $V_D$ exceeds the threshold voltage $V_{th}$, i.e., when the temperature of the power IC is within an overheating temperature range, the buffer 4 outputs a 2-value signal. As shown in FIG. 2, the buffer 4 and the MOSFET 3 make up a determining circuit 5.

Figure 3:
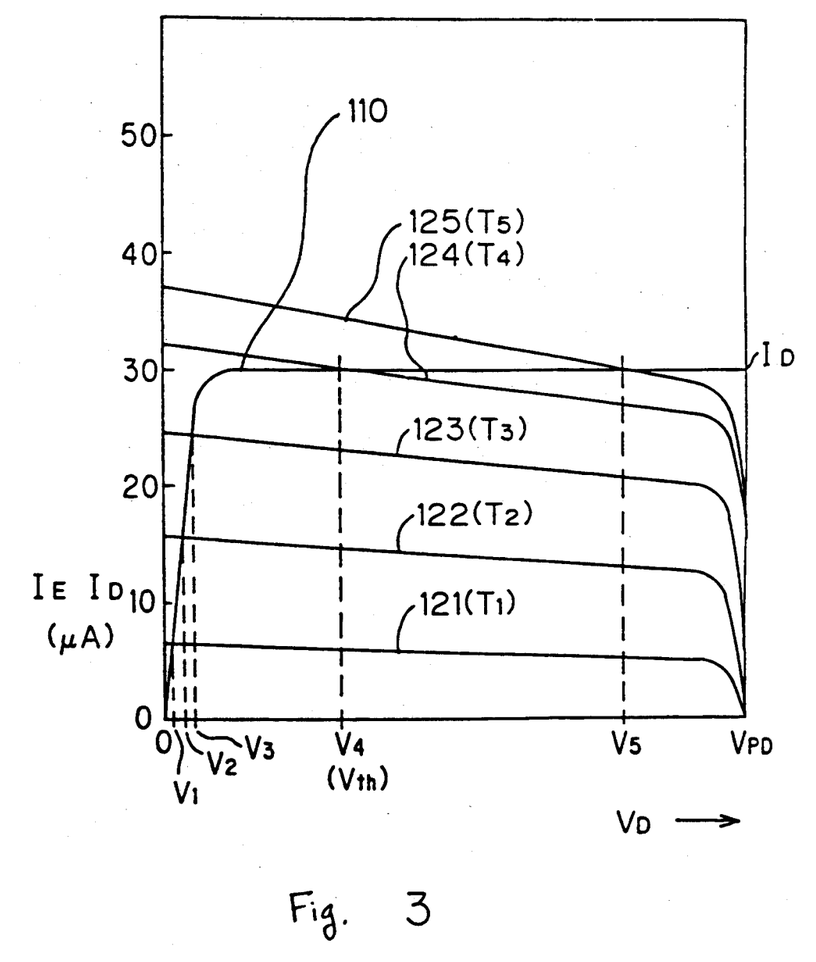
FIG. 3 is a graph useful in explaining an operation of the circuit shown in FIG. 2.

As shown in FIG. 3, a curve 110 designates a $V_D$-$I_D$ characteristic curve representing a static characteristic of the MOSFET 3. Curves, 121-125 represent voltage characteristic curves of the amplified reverse leakage current $I_E$ at temperatures $T_1$-$T_5$, respectively. As shown, when the drain voltage $V_D$ is applied to the MOSFET 3 and gradually increased from zero, the drain current $I_D$ sharply increases in the initial stage. When $V_D$ exceeds a pinch-off voltage, the drain current $I_D$ becomes stable at a constant current (30 μA in this instance). As the temperature rises from $T_1$-$T_5$, the output emitter current $I_E$ increases in such a way that the curves of the emitter current $I_E$ at the respective temperature are substantially parallel one to another in their high current portions. In the overheating detection circuit of FIG. 2, the drain current $I_D$ flowing into the MOSFET 3 is the same as the emitter current $I_E$ of the NPN transistor 2C. Accordingly, a potential drop across the MOSFET 3 that is caused when the emitter current $I_E$ flows through the MOSFET 3, viz., the drain voltage $V_D$ of the MOSFET 3, is determined by points where the curve 110 intersects the curves 121-125 at the respective temperatures. In a region where the temperature of the power IC is low, i.e., at $T_1$, $T_2$, and $T_3$, the curves 121, 122, and 123 intersect the steeply rising portion of the curve 110, so that the leakage currents are converted into low drain voltages $V_1$ to $V_3$. In a region where the temperature is high, i.e., at $T_4$ and $T_5$, the curves 124 and 125 intersect a substantially constant current portion of the curve 110. Accordingly, the leakage current is converted into the drain voltages $V_4$ and $V_5$. Therefore, if the overheating detection circuit is arranged so that the temperatures $T_4$ and $T_5$ correspond to overheating detection temperatures, then a slight temperature change can be converted into a large voltage change in the overheating detection temperature range of $T_4$-$T_5$. More specifically, if the threshold value $V_{th}$ of the buffer 4 is set at $V_4$, for example, when the drain voltage $V_D$ of the MOSFET 3 exceeds the threshold voltage $V_{th}$, the buffer 4 produces a low level signal $V_{out}$, which is the inversion of the drain voltage $V_D$. In this way, the present invention detects that the temperature of the power IC has reached the overheating temperature. The power IC can be protected from thermal destruction when the output signal $V_{out}$ of the buffer 4 is changed from a level "1" (high potential) to a level "0" (low potential) by turning off the power IC in response to the level "0" output signal.

In the circuit arrangement of FIG. 2, the overheating detection temperature can be set by properly selecting a junction area of the PN junction 1, a current amplification factor of the NPN transistors 2A, 2B and 2C as well as the number of amplifying stages comprising NPN transistors 2A, 2B and 2C a saturation current of the depletion type MOSFET 3, and the threshold voltage $V_{th}$ of the buffer 4. Thus, the instant overheating detection circuit can be flexibly and exactly adjusted to detect overheating detection temperatures within a broad range of 50°-200° C. or more, for example.

As described above, according to the instant embodiment, the overheating detection circuit can be constructed with only six components. The overheating detection circuit thus constructed can convert a temperature dependency of the weak inverse leakage current of the PN junction into a large 2-value signal. Further, in manufacturing the overheating detection circuit, it can readily be formed in the same semiconductor substrate as that of the power IC. The reverse leakage current of the PN junction, which is weak but has a large temperature dependency, is amplified by utilizing a temperature dependency of the amplification factor of the NPN transistors. Still further, only the reverse leakage current corresponding to the overheating detection temperature range is converted into a large voltage change by utilizing a constant current characteristic of the depletion type MOSFET. This voltage change is further converted into an output signal by the buffer with the threshold voltage. Thus, the instant embodiment successfully solves the technically difficult problem of processing the weak reverse leakage current of the PN junction, and accurately detects an overheating temperature.

Figure 4:
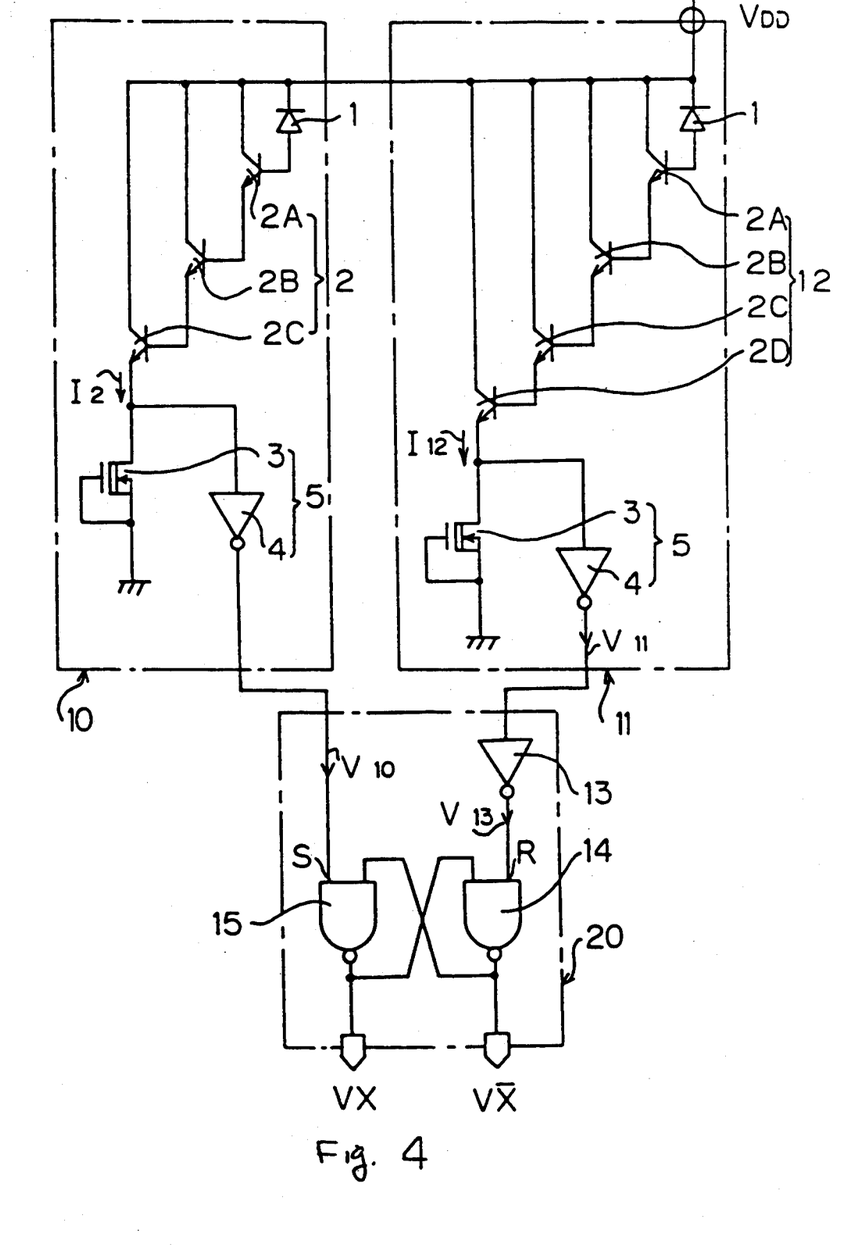
FIG. 4 is a circuit diagram of a second embodiment of an overheating detection circuit according to the present invention.

As shown in FIG. 4, the overheating detection circuit according to a second embodiment of the present invention comprises a first detector 10 having a circuit arrangement resembling that of the first embodiment, a second detector 11 having a 4-stage amplifier 12 including an NPN transistor 2D in addition to the NPN transistors 2A, 2B, and 2C of the first embodiment, and a hysteresis circuit 20 for receiving output signals $V_{10}$ and $V_{11}$ of the first and second detectors 10 and 11. The hysteresis circuit 20 comprises an inverter 13 for inverting the output signal $V_{11}$ of the second detector 11, and NAND gates 14 and 15 coupled with each other in a feedback manner. The NAND gates 15 and 14 receive the output signal $V_{10}$ of the first detector 10 as a set signal, and an output signal $V_{13}$ of the inverter 13 as a reset signal, respectively, and output a composite signal VX and an inverted signal VX bar, respectively.

An operation of the overheating detection circuit shown in FIG. 4 will be described with reference to the timing chart shown in FIG. 5. A threshold value of the buffer 4 in the first and second detectors 10 and 11 is set to a value corresponding to an overheating detection temperature $V_H$. The emitter current $I_{12}$ of the 4-stage amplifier 12 in the second detector 12 is larger than the emitter current $I_2$ of the 3-stage amplifier 2 in the first detector 11 such that detecting temperature $T_L$ of the second detector 12 is proportionally lower than that of the first detector 10. Accordingly, a temperature difference $\Delta T$ is produced between the detecting temperatures $T_H$ and $T_L$, as shown in FIG. 5.

Figure 5:
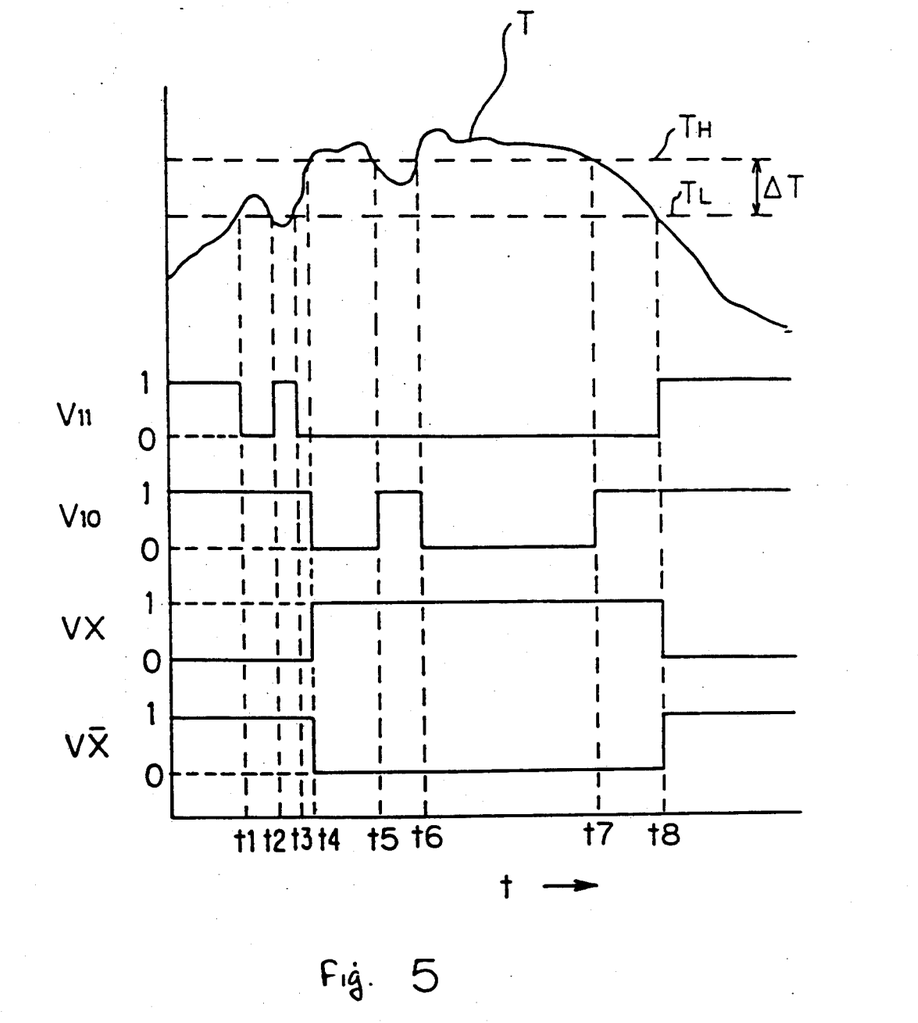
FIG. 5 is a timing chart useful for explaining an operation of the overheating detection circuit of FIG. 4.

Assuming that the temperature T of a power IC varies as shown in FIG. 5, before the time $t_l$, the temperature T is below the temperature $T_L$, the output signals $V_{10}$ and $V_{11}$ of the first and second detectors 10 and 11 and are logic "1" (or high level), and the hysteresis circuit 20 is placed in a reset state, thereby producing the inverted output signal VX bar of logic "1" and the composite output signal VX of logic "0". At the time point $t_l$, the temperature T reaches the detecting temperature $T_H$ wherein the second detector 11 detects the temperature T, and changes the logic level of its output signal $V_{11}$ from logic "1" to logic "0". The logic states of the output signals of the NAND gates 14 and 15, which receive the output signal $V_{11}$ of logic "0" through the inverter 13, remain unchanged. At time points $t_2$ and $t_3$, the temperature T drops below the detection temperature $T_L$. Also at this time, the logic states of the output signals VX and VX bar of the hysteresis circuit 20 are left unchanged, although the output signal $V_{11}$ changes its logic state.

At the time point $t_4$, the temperature T rises and reaches the overheating detection temperature $T_H$ of the first detector 10. The first detector 10 changes the logic state of its output signal from logic "1" to logic "0". The NAND gates 14 and 15, when receiving it at the set terminal, change logical states of the output signals such that the output signal VX is set to logic "1" and the signal VX bar is set to logic "0". The changed logic states of the output signals VX and VX bar of the NAND gates 14 and 15 are maintained even at the time points $t_5$, $t_6$, and $t_7$ where the temperature T is below the detection temperature within the difference $\Delta T$, and the output signal $V_{10}$ of the first detector 10 changes its logic state. At the time point $t_8$, the temperature T drops to the detection temperature $T_L$. The second detector 11 detects this and changes the logic state of its output signal to logic "1". At this time, the output signal VX goes low (logic "0"), and the inverted output signal VX bar goes high. Then, the hysteresis circuit 20 is again placed in the reset state.

As described above, in the overheating detection circuit, the two temperature detectors 10 and 11 have the two detection temperatures $T_H$ and $T_L$, respectively, and, therefore, the preset temperature difference $\Delta T$ is provided. The hysteresis circuit 20 performs a hysteresis operation on the basis of the temperature difference $\Delta T$. Therefore, irregular and short period variations in the temperature T of the power IC due to a variation of the load at temperatures near the overheating detection temperature, can be ignored as temperature noise. This fact implies that in an overheating state, the power IC can be stably held at off state in accordance with the output signal V and the inverted output signal VX bar. With this feature, adverse effects due to unnecessary protection operations on the load circuit, and electromagnetic noise can be reduced. The resultant overheating protection function is reliable. To be more specific, let us consider a case that $T_H = 170°$ C. and $T_L = 140°$ C., and the temperature of the power IC reaches an overheating temperature of 170° C. In this case, the protection function prohibits the power IC from being turned on until a temperature of the power IC drops to a temperature lower than 140° C. where a satisfactory level of safety is guaranteed. In this respect, a very reliable overheating protection is realized.

Figure 6:
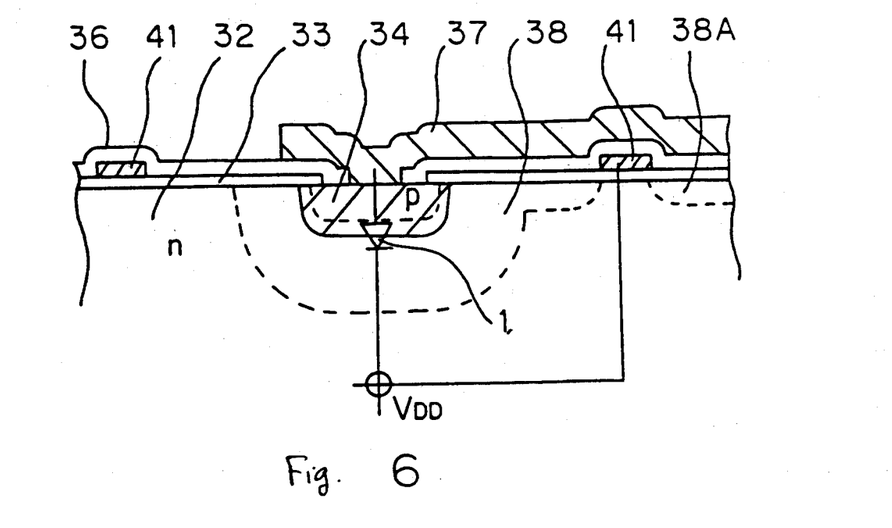
FIG. 6 is a sectional view showing a structure of a junction of the overheating detection circuit of the first and second embodiments.
Figure 7:
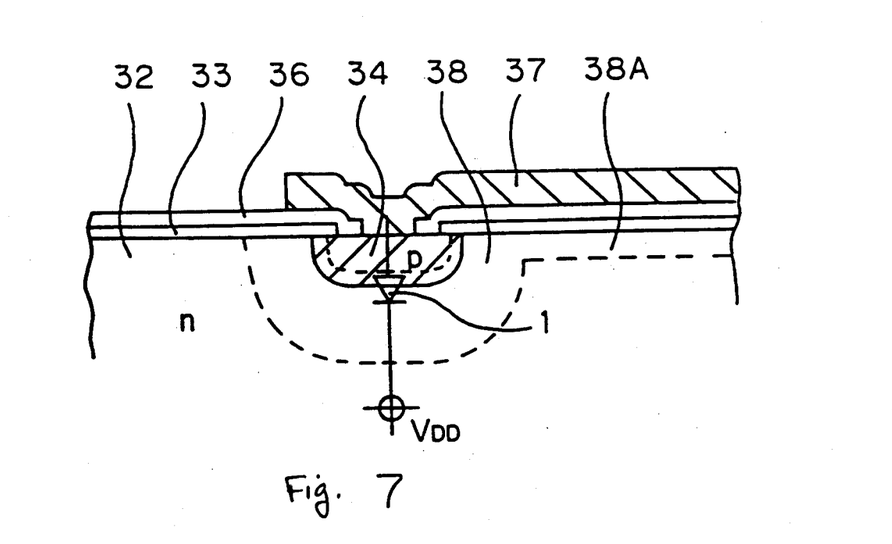
FIG. 7 is a sectional view showing a structure of an example junction, which is illustrated as a vehicle for comparison.
Figure 8:
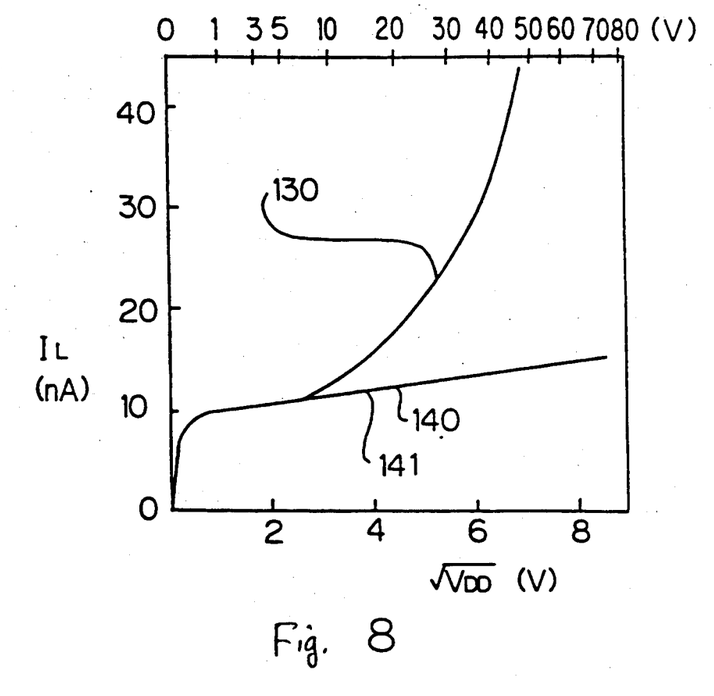
FIG. 8 is a graphical representation of variations of a reverse leakage current of the PN junction versus voltage.

FIG. 6 is a sectional view showing a structure of a junction part of the overheating protection circuit of the first and second embodiments. FIG. 7 is a sectional view showing a structure of the corresponding part of an example, which is illustrated as a vehicle for comparison. FIG. 8 is a graphical representation of variations of a reverse leakage current of the PN junction with respect to voltage. A PN junction 1, comprising a typical diode, which is illustrated as a vehicle for comparison in FIG. 7, is manufactured in the following manner. By using a window of an oxide film 33 formed on an N-type substrate 32, a P-type diffusion layer 34 is formed. Then, a phosphorus glass layer 36 is formed over the structure. Then, a window is opened in the phosphorus glass layer 36, and a metal wiring layer 37 is electrically connected to the P-type diffusion layer 34. When a reverse bias voltage $V_{DD}$ is applied to the PN junction thus structured, a reverse leakage current $I_L$ traces a curve 140 with respect to a square root of the bias voltage $V_{DD}$, as shown in FIG. 8, if the diode 1 is an ideal diode. More specifically, when the reverse bias voltage $V_{DD}$ is applied across the PN junction, a depletion layer 38 is formed in the substrate side of the junction and a reverse leakage current $I_L$, which is proportional to a volume of the depletion layer, flows. The curve 140 tends to gently increase with respect to the reverse bias voltage $V_{DD}$. However, when the bias voltage $V_{DD}$ exceeds a predetermined voltage, another depletion layer 38A is formed in the surface region of the N-type substrate right under the metal wiring layer 37. As a result, the volume of the depletion layer 38 increases and the leakage current $I_L$ of the PN junction of the comparative example shown in FIG. 7 abruptly increases as indicated by a curve 130, which greatly deviates from the curve 140 of the ideal diode, and sharply rises as shown in FIG. 8. If such a diode is incorporated into the overheating detection circuit as shown in FIG. 2 or 4, the reverse leakage current $I_L$ greatly changes when the reverse bias voltage $V_{DD}$ changes. Thus, the overheating temperature detected is unreliable.

In the structure shown in FIG. 6, a poly silicon channel stopper 41 as a conductive layer is provided between the oxide film 33 and the phosphorus glass layer 36 beneath the metal wiring layer 37. The stopper 41 is set at the same potential as that of the N-type substrate 32, viz., potential $V_{DD}$. With this, the depletion layer 38A extending under the metal wiring layer 37 is cut off. As a result, an increase of the volume of the depletion layer 38 is restricted so that, as shown in FIG. 8, a curve 141, representative of the voltage dependency of the reverse leakage current $I_L$, substantially overlaps with the ideal curve 140. When the reverse bias voltage $V_{DD}$ is set at 32 V, for example, a variation of a detection temperature by the circuit of FIG. 2 can be reduced within 5° C.

Figure 9:
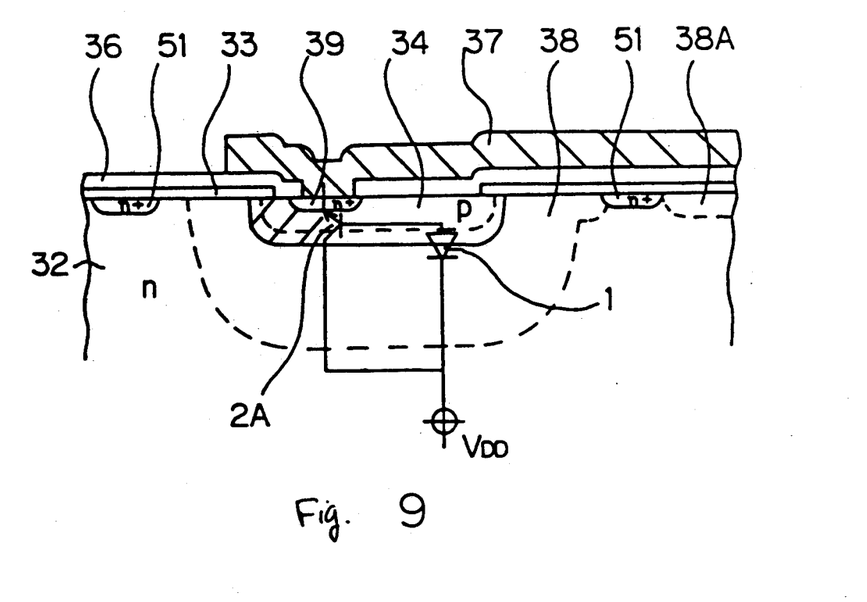
FIG. 9 is a sectional view of a key portion of a modification of the structure of FIG. 6.

Turning now to FIG. 9, there is shown a sectional view of a key portion of a modification of the structure of FIG. 6. In the structure, a P-type diffusion layer 34 formed in an N-type substrate 32 and an n+ diffusion layer 39 form a PN junction. An NPN transistor 2A is provided. For those elements, an n+ diffusion channel stopper 51 is formed in the surface region of the N-type substrate 32 beneath the metal wiring layer 37. As in the structure of FIG. 6, the depletion layer 38A extending under the metal wiring layer 27 is cut off by the n+ diffusion channel stopper 51. As a result, the voltage dependency of the volume of the depletion layer 38 is restricted and a curve of the reverse leakage current $I_L$ of the PN junction 1 can be controlled so as to make it coincident with the ideal curve.

As shown in FIG. 9, the n+ diffusion channel stopper 51, together with the emitter of the first stage NPN transistor 2A, is formed in the P-type diffusion layer 34 in the same step of a manufacturing process, thereby forming a structure wherein the diode 1 as the PN junction and the NPN transistor 2A, as equivalently illustrated, are integrally assembled. Accordingly, the overheating detection circuit and the power IC can be formed in the same substrate and in the same process step. Therefore, manufacturing costs become low. The power voltage dependency of the emitter current of the NPN transistor 2 is also made weak, and hence the effects of the power voltage on the detection temperature are removed. Therefore, if the overheating detection circuit is connected to the same high voltage power source as that of the power IC, an accurate temperature detection can be secured in the overheating detection circuit.

As seen from the foregoing description, in an overheating detection circuit according to the present invention, a reverse leakage current of a reversely biased PN junction is amplified to a predetermined level by bipolar transistors. The amplified reverse leakage current is converted into a potential drop across a constant current circuit in a determining circuit. A buffer with a threshold value converts the potential drop into a corresponding 2-value signal. The overheating detection circuit thus arranged is assembled into a substrate into which a power IC is assembled. By utilizing a large temperature dependency of the reverse leakage current of the PN junction diode and a temperature dependency of the amplification factor of the bipolar transistors, a signal corresponding to a temperature change of the power IC can be amplified to such a value as to allow its signal processing. Further, a leakage current corresponding to a temperature in the temperature region of detection overheating of the power IC can be converted into a large voltage change by utilizing a constant current region of a depletion type MOSFET as the constant current circuit. A temperature detection of the overheating detection circuit is very sensitive particularly in the temperature range of 150°-180°. In this performance, the overheating detection circuit is remarkably improved over the prior art. Only six components are required for forming the overheating detection circuit. The overheating detection circuit and the power IC are formed in the same substrate and in the same step. With these features, a small, inexpensive power IC having an overheating detection circuit can be provided.

In an overheating detection circuit comprising two detectors, each having a distinct detection temperature and a hysteresis circuit, the protecting function of the circuit may be inoperable for short period and small variations of temperature of the power IC near the detection temperatures, if the temperature difference $\Delta T$ between the different detection temperatures is appropriately selected. Therefore, adverse effects due to unnecessary repetition of the protecting operation, as well as electromagnetic noise caused by it can be eliminated. When an overheating temperature of a power IC is detected, the operation of the power IC is stopped and its restart is prohibited until it is confirmed that the overheating temperature detected drops to a temperature in a safety region which is $\Delta T$ lower than the detected temperature. Therefore, there is provided an overheating protecting circuit which is stably, reliably, and safely operable.

In an overheating detection circuit with such a structure that a channel stopper is provided just under the metal wiring layer to the PN junction or the NPN transistor, the depletion layer right under the PN junction is prevented from extending to under the wiring layer. Thus, the voltage dependency of the reverse leakage current of the PN junction and that of the emitter current of the NPN transistor is eliminated. Therefore, if an overheating detection circuit is formed in the same substrate as that of a high voltage power IC, a detection temperature is influenced little by the voltage dependency and the voltage variation. For example, if the power source voltage is set at 32 V, a variation of the overheating detection temperature can be restricted within 5° C. Therefore, a power device, such as a power IC, containing such a reliable overheating detection circuit can be provided.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed:

1. An overheating detection circuit for detecting an overheating of a power integrated circuit, said power integrated circuit being formed in a substrate, comprising:

a reversely biased junction having a reverse leakage current, said reverse leakage current being temperature dependent;

means for amplifying said reverse leakage current; and means for producing a voltage proportional to said amplified reverse leakage current and for producing a signal when said voltage exceeds a threshold voltage to indicate that said power integrated circuit is overheated, said overheating detection circuit being disposed in said substrate.

2. An overheating detection circuit for detecting an overheating of a power integrated circuit, said power integrated circuit being formed in a substrate, comprising:

first and second temperature detection circuits, said first temperature detection circuit having a first temperature threshold and said second temperature detection circuit having a second temperature threshold lower than said first temperature threshold, each of said temperature detection circuits having a reversely biased junction having a reverse leakage current, said reverse leakage current being temperature dependent, means for amplifying said reverse leakage current, and means for producing a voltage proportional to said amplified reverse leakage current and for producing a signal when said voltage exceeds an associated threshold voltage to indicate that said power integrated circuit has a temperature exceeding a respective one of said temperature thresholds; and hysteresis means for receiving said signals produced by said first and second temperature detecting circuits, for producing an overheating signal upon receipt of said signal produced by said first temperature detecting circuit to indicate that said power integrated circuit is overheated, and for inhibiting the output of said overheating signal upon a receipt of said signal produced by said second temperature detecting circuit after receipt of said signal produced by said first temperature detecting circuit to indicate that said power integrated circuit is not overheated, said overheating detection circuit being disposed in said substrate.

3. The overheating detection circuit of claim 2, wherein said hysteresis means comprises inverting means for inverting said signal produced by said second temperature detecting circuit, and first and second NAND gates.

4. The overheating detection circuit of claim 2, wherein said means for amplifying amplifies said reverse leakage current of said reversely biased junction of said second temperature detection circuit more than said reverse leakage current of said reversely biased junction of said first temperature detection circuit, and wherein said threshold voltage associated with said second temperature detection circuit is substantially equal to said threshold voltage associated with said first temperature detection circuit.

5. The overheating detection circuit of claim 1 or 2, wherein said junction comprises a PN junction diode.

6. The overheating detection circuit of claim 5, further comprising means for limiting a volume of a depletion layer of said PN junction diode to control said temperature dependency of said reverse leakage current.

7. The overheating detection circuit of claim 6, wherein said means for limiting comprises a polysilicon layer.

8. The overheating detection circuit of claim 1 or 2, wherein said means for amplifying comprises at least one transistor.

9. The overheating detection circuit of claim 1 or 2, wherein said means for producing comprises a constant current circuit for producing said voltage proportional to said amplified reverse leakage current, and a buffer circuit having said threshold voltage for producing said signal when said voltage exceeds said threshold voltage.

10. The overheating detection circuit of claim 9, wherein said constant current circuit comprises a MOSFET.

* * * * *